United States Patent
Chen et al.

(10) Patent No.: US 9,385,920 B1
(45) Date of Patent: Jul. 5, 2016

(54) RACK HAVING MULTIPLE RACK MANAGEMENT MODULES AND FIRMWARE UPDATING METHOD FOR THE SAME

(71) Applicant: AIC INC., Taoyuan Hsien (TW)

(72) Inventors: Yen-Yu Chen, Taoyuan Hsien (TW); Shih-Chieh Hsu, Taoyuan Hsien (TW)

(73) Assignee: AIC INC., Taoyuan Hsien (TW)

( * ) Notice: Subject to any disclaimer, the term of this patent is extended or adjusted under 35 U.S.C. 154(b) by 0 days.

(21) Appl. No.: 14/688,124

(22) Filed: Apr. 16, 2015

(51) Int. Cl.
  *G06F 9/445* (2006.01)
  *H04L 12/24* (2006.01)

(52) U.S. Cl.
  CPC ............... *H04L 41/082* (2013.01); *G06F 8/65* (2013.01)

(58) Field of Classification Search
  None
  See application file for complete search history.

(56) References Cited

U.S. PATENT DOCUMENTS

| | | | | |
|---|---|---|---|---|
| 8,707,290 | B2* | 4/2014 | Brundridge | G06F 8/65 709/209 |
| 2005/0071837 | A1 | 3/2005 | Butt et al. | |
| 2005/0257213 | A1 | 11/2005 | Chu et al. | |
| 2006/0277538 | A1* | 12/2006 | Saha | G06F 11/1438 717/168 |
| 2007/0174601 | A1* | 7/2007 | Douglas | G06F 8/65 713/1 |
| 2007/0234332 | A1* | 10/2007 | Brundridge | G06F 8/65 717/168 |
| 2008/0256525 | A1* | 10/2008 | Ellsworth | G06F 8/60 717/168 |
| 2014/0123121 | A1* | 5/2014 | Chiu | G06F 11/1433 717/168 |
| 2015/0199519 | A1* | 7/2015 | Marr | G06F 21/572 726/22 |

FOREIGN PATENT DOCUMENTS

WO    2014161986 A1    10/2014

OTHER PUBLICATIONS

Office Action dated Dec. 14, 2015 of the corresponding Finnish patent application.

\* cited by examiner

*Primary Examiner* — Daxin Wu
(74) *Attorney, Agent, or Firm* — Chun-Ming Shih; HDLS IPR Services

(57) ABSTRACT

A rack having multiple rack management modules is disclosed. Each rack management module respectively comprises a Rack Management Controller (RMC), a switch and a memory, wherein the switch of each rack management module is interconnected, a firmware is saved on each memory respectively. When the RMC receives a firmware update image and an updating command uploaded externally, the RMC sends a switching instruction to the switch for enabling the switch to switch and connect to the memory of another rack management module. When the RMC executes a firmware updating procedure, the firmware in the memory of another rack management module is updated via switch connection. The present invention can effectively avoid the issue that the RMC is not able to boot normally after the firmware updating fails leading to that the rack is not able to re-update the firmware.

8 Claims, 7 Drawing Sheets

RACK HAVING MULTIPLE RACK MANAGEMENT MODULES AND FIRMWARE UPDATING METHOD FOR THE SAME

BACKGROUND OF THE INVENTION

1. Field of the Invention

The present invention relates to a rack, in particularly relates to a rack having multiple rack management modules, and a firmware updating method used by the rack.

2. Description of Prior Art

Traditionally, a server rack receives a plurality of servers and a Rack Management Controller (RMC). The rack administrators collect server information and control the servers via connecting the RMC to the servers.

The RMC is a kind of System on Chip (SoC) with memories, and is booted via firmware. As a result, similar to Central Processing Units (CPUs) of the servers, the rack administrators have to perform updates on firmware of the RMC from time to time.

Generally, the RMC receives firmware update images, and performs an update automatically on the firmware. Yet if the updating procedure is accidentally interrupted during execution (for example the servers crashed or the rack power is off), or the incorrect firmware is used in the updating procedure, after the RMC restarted, the RMC may not be able to boot normally. In the prior art, each rack is equipped with one RMC, accordingly if the RMC fails to boot normally, then all servers in the rack fail to function normally which is not desirable to server users.

Further, since the RMC cannot boot normally after firmware update fails, the rack is not able to re-update the firmware without external support (for example update manually by the rack administrators) for resolving the issue.

In view of this, it is an object to people who skills in the art to provide solutions where the RMC is able to re-update the firmware without external support after the firmware update fails and assures that the RMC is able to boot normally.

SUMMARY OF THE INVENTION

The primary objective of the present invention is to provide a rack having multiple rack management modules and a firmware updating method for the same. The rack enables the rack management module to perform update on firmware of other rack management modules in order to avoid the issue that the rack management module is not able to boot normally after the firmware update fails, and further the rack is not able to re-update the firmware.

The other objective of the present invention is to provide a rack having multiple rack management modules and a firmware updating method for the same, where the multiple rack modules perform heartbeat detection with each other, and provide backup solutions when other rack management modules is detected operating abnormally.

In order to achieve the above goals, the rack disclosed in the present invention has multiple rack management modules, each rack management module respectively comprises a rack management controller (RMC), a switch and a memory, wherein the switch of each rack management module is interconnected and respectively firmware is saved in each memory. When the RMC receives external uploaded firmware update images, the RMC sends a switching instruction to the switch for enabling the switch to switch and connect to the memory of another rack management module. When the RMC executes a firmware updating procedure, the RMC perform an update on the firmware in the memory of another rack management module via switch connection.

Comparing with related art, the RMC of the present invention does not perform update on the firmware of the same rack management module. Accordingly, even if the firmware updating procedure is accidentally interrupted leading to update failure, the RMC is able to boot normally after being reset regardless of the firmware update failure. Accordingly, even if the firmware updating procedure of the firmware fails, the RMC still is able to perform update on the firmware again until an update succeeds. Thus, the risk that the administrators are required to manually fix the RMC which is not able to boot normally due to firmware update failure is lowered.

In addition, according to the present invention, multiple management modules are provided in one rack and each rack management module is interconnected and performs heartbeat detection of each other. Thus, when abnormal operation of one of the rack management modules is detected, other rack management modules can be used to provide backup operation solutions. Accordingly, the issue that the whole rack is not able to function normally after the rack management modules have errors is excluded.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
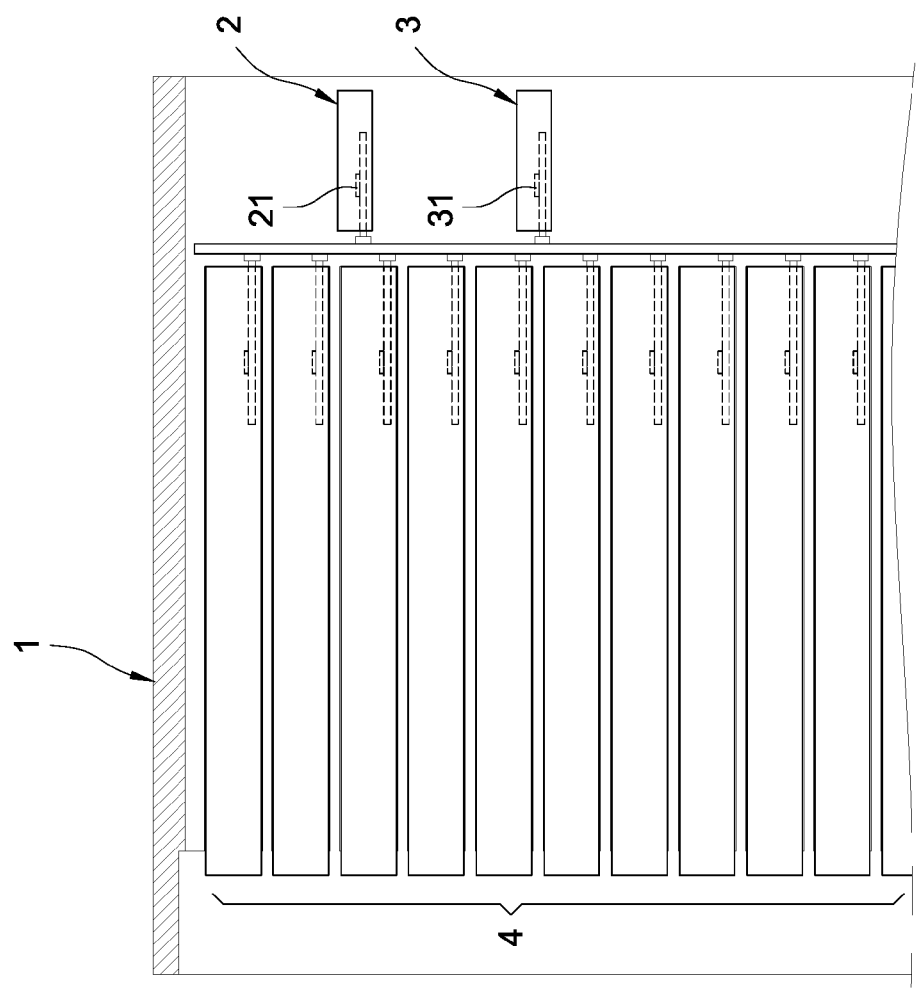
FIG. 1 is a schematic view of a rack in the first embodiment according to the present invention.

FIG. 1 is a schematic view of a rack in the first embodiment according to the present invention. In FIG. 1, the rack 1 has multiple receiving slots for receiving multiple nodes 4. The rack 1 also has multiple rack management modules, respectively and electrically connected with the nodes 4 used for collecting the information of the nodes 4, and control the nodes 4. In the embodiment, a first rack management module 2 and a second rack management module 3 are used for illustrating the multiple rack management modules and the quantity is not limited thereto.

In the present invention, each rack management module has a rack management controller (RMC), a switch and a memory. The RMC connects with the memory via the switch, and a firmware is saved in the memory and used by the RMC for booting.

Figure 2:
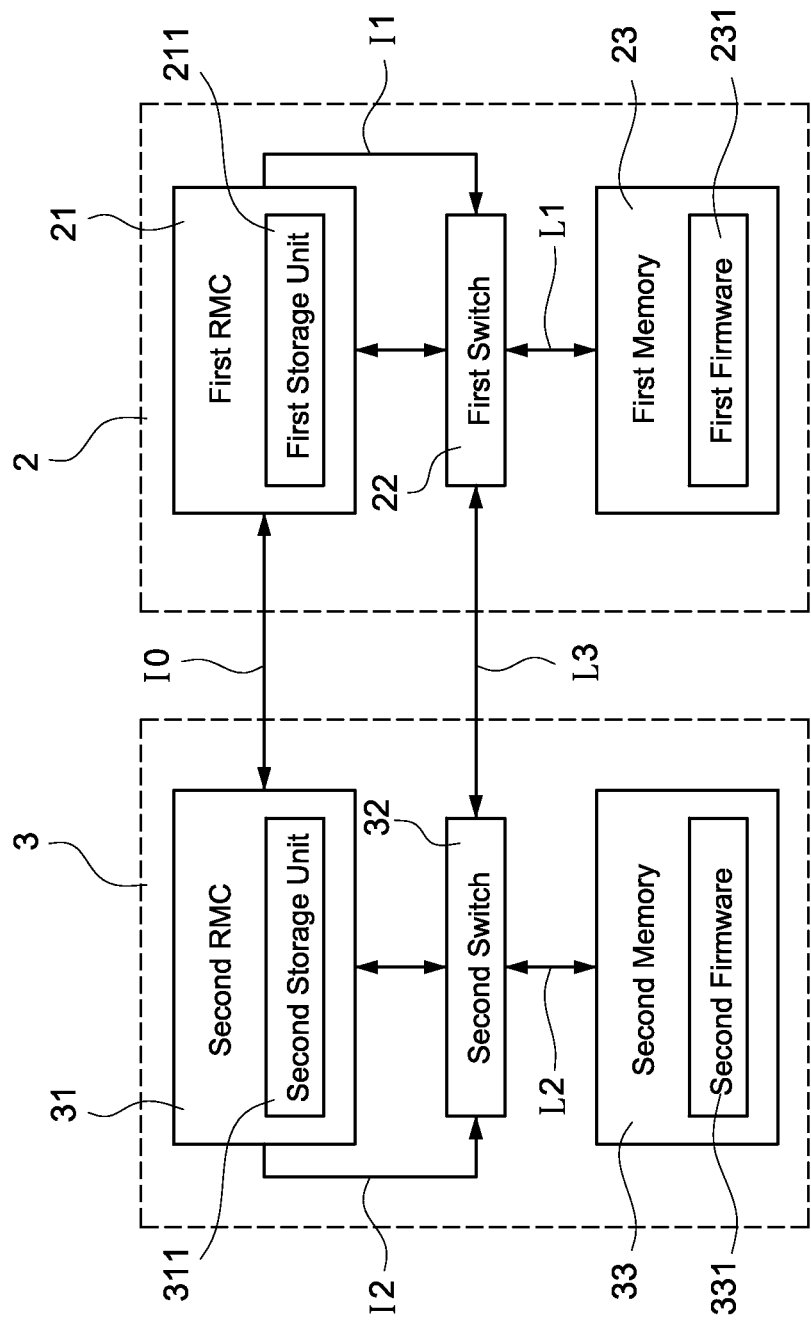
FIG. 2 is a connection schematic view of a rack in the first embodiment according to the present invention.

FIG. 2 is a connection schematic view of a rack in the first embodiment according to the present invention. As shown in FIG. 2, the above first rack management module 2 has a first RMC 21, a first switch 22 and a first memory 23. The first RMC 21 connects to the first switch 22, and connects to the first memory 23 via the first switch 22. A first firmware 231 is saved in the first memory 23 and is used by the first RMC 21. In addition, the second rack management module 3 has a second RMC 31, a second switch 32 and a second memory 33. The second RMC 31 connects to the second switch 32, and connects to the second memory 33 via the second switch 32. A second firmware 331 is saved in the second memory 33 and is used by the second RMC 31. In the embodiment, the first memory 23 and the second memory 33 is implemented as a Read Only Memory (ROM) and is not limited thereto.

As shown in FIG. 2, the first switch 22 connects to the first memory 23 via a first access channel L1, the second switch 32 connects to the second memory 33 via a second access channel L2. When the first RMC 21 boots, the first RMC 21 retrieves the first memory 23 via the first access channel L1 with the connection to the first switch 22 and executes the first firmware 231 for finishing the booting procedure. Similarly, when the second RMC 31 performs a boot, the second RMC 31 retrieves the second memory 33 via the second access channel L2 with the connection to the second switch 32, and executes the second firmware 331 for finishing the booting procedure.

In the present invention, the switches of the multiple rack management modules are interconnected. In the embodiment shown in FIG. 2, the first switch 22 and the second switch 32 are interconnected. Further in details, in the embodiment, the first switch 22 and the second switch 32 are connected via a third access channel L3.

The main technical characteristic of the present invention is that when the first RMC 21 executes a firmware updating procedure, the first RMC 21 performs an update on the second firmware 331 in the second memory 33. When the second RMC 31 executes the firmware updating procedure, the second RMC 31 performs an update on the first firmware 231 in the first memory 23. Accordingly, the first RMC 21 is able to boot normally after being reset because of the update on the first firmware 231 performed by itself fails. Similarly, the second RMC 31 is able to boot normally after being reset because of the update on the second firmware 331 performed by itself fails.

Further in details, the first RMC 21 also connects to the first switch 22 via a first instruction transmission interface I1; the second RMC 31 also connects to the second switch 32 via a second instruction transmission interface I2. When the first RMC 21 executes the updating procedure, the first RMC 21 transmits a switching instruction to the first switch 22 via the first instruction transmission interface I1. The first switch 22 performs switching according to the switching instruction in order to connect to the second switch 32 via the third access channel L3, and connects to the second memory 33 via the second access channel L2. As a result, the first RMC 21 retrieves the second memory 33 respectively via the first switch 22, the third access channel L3, the second switch 32 and the second access channel L2, so as to perform the updating procedure on the second firmware 331.

Similarly, when the second RMC 31 executes the updating procedure, the second RMC 31 sends a switching instruction to the second switch 32 via the second instruction transmission interface I2. The second switch 32 performs switching according to the switching instruction in order to connect to the first switch 22 via the third access channel L3, and then connects to the first memory 23 via the first access channel L1. As a result, the second RMC 31 retrieves the first memory 23 respectively via the second switch 32, the third access channel L3, the first switch 22 and the first access channel L1, so as to perform the updating procedure on the first firmware 231.

It should be noted that, the RMCs of the multiple rack management modules are interconnected according to the present invention. In FIG. 2, the first RMC 21 and the second RMC 31 of the embodiment are interconnected. Further in details, the first RMC 21 and the second RMC 31 are connected via a communicating interface I/O. In the embodiment, the communicating interface I0 is a General Purpose I/O (GPIO) interface, a Universal Asynchronous Receiver/Transmitter (UART) interface, an Inter-Integrated Circuit (I$^2$C) interface, an Intelligent Platform Management Bus (IPMB) interface, a Local Area Network (LAN) interface etc., and is not limited thereto.

In the present invention, the first RMC 21 and the second RMC 31 perform heartbeat detection with each other via the communicating interface I0, and provide a backup operation solution. In details, each RMC 21, 31 detects abnormal heartbeat of another RMC via the communicating interface I0, the RMC is able to enforce the reset of the another RMC via sending an instruction through the communicating interface I0 if an abnormal heartbeat of the another RMC is detected, and assign itself as an active RMC in the rack 1. As a result, when one of the RMCs in the rack 1 operates abnormally, another RMC is able to perform backup operation. After the abnormal RMC is reset, then the operation is recovered to the original. The above technical solution can effectively avoid the issue that the multiple nodes in the rack are not able to operate normally when the only one RMC disposed in a rack has errors.

Figure 3:
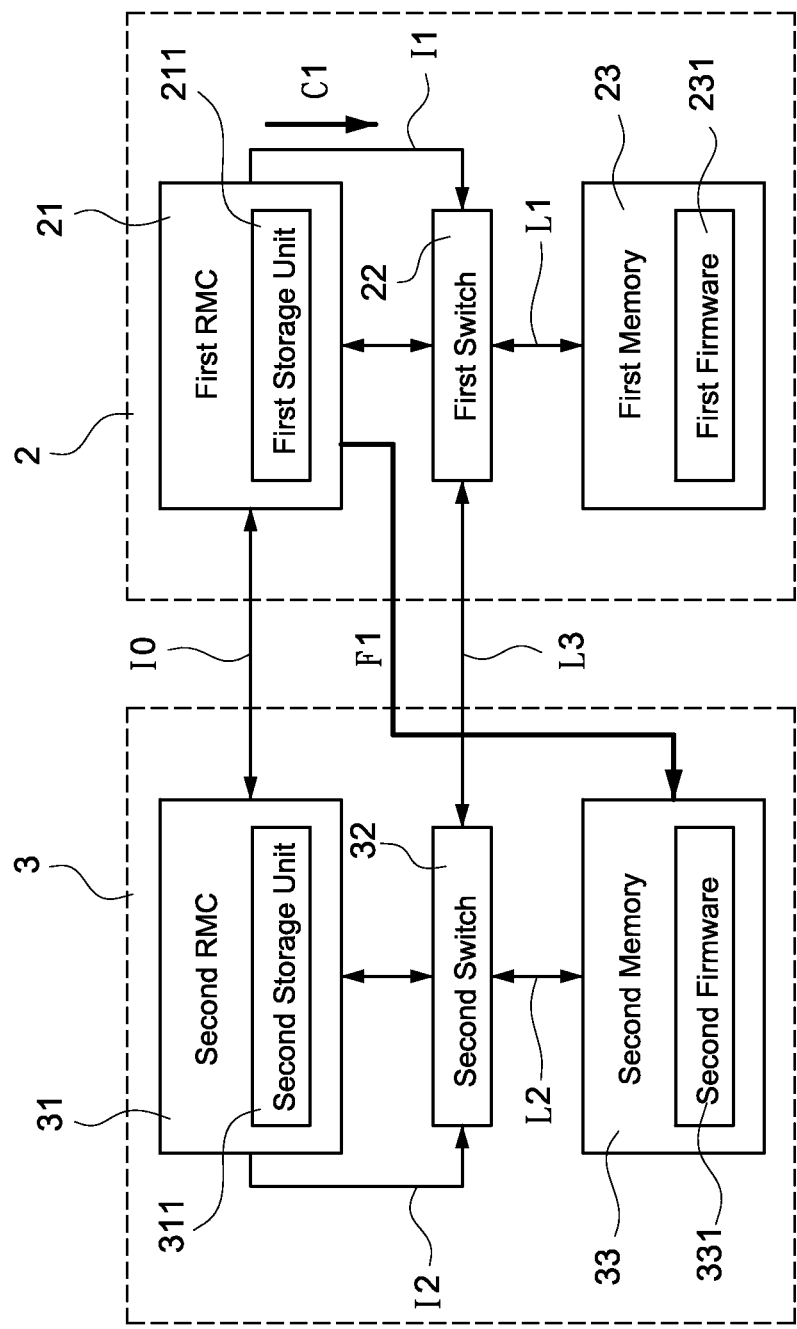
FIG. 3 is a schematic view of a firmware update operation in the first embodiment according to the present invention.

FIG. 3 is a schematic view of a firmware update operation in the first embodiment according to the present invention. FIG. 3 is used for illustrating the operation flow of the first rack management module 2.

When the first RMC 21 boots, the first RMC 21 retrieves the first firmware 231 in the first memory 23 via the first switch 22 and the first access channel L1, and executes the first firmware 231 to finish the booting procedure.

When the first RMC 21 receives a firmware update image F1 and a updating command transmitted externally, the first RMC 21 sends a first switching instruction C1 to the first switch 22 via the first instruction transmission interface I1, the first switch 22 switches and connects to the second switch 32 of the second rack management module 3 according to the first switching instruction C1. Thus, the first RMC 21 retrieves the second memory 33 via the first switch 22, the third access channel L3, the second switch 32 and the second access channel L2, and the first RMC 21 performs an update on the second firmware 331.

After the update is finished, the first RMC 21 is reset, and the first switch 22 is recovered to the initial settings (i.e., connect to the first memory 23 via the first access channel L1). Thus, after the first RMC 21 is reset, the booting procedure is still finished by executing the first firmware 231 in the first memory 23. In other words, even if the updating procedure execution fails last time, the booting operation of the first RMC 21 is not affected because the failed updating procedure is performed on the second firmware 331.

It should be noted that, the first RMC 21 is installed with a first storage unit 211 for temporarily saving the externally transmitted firmware update image F1. When the first RMC 21 performs the updating procedure on the second firmware 331, the firmware update image F1 temporarily saved in the first storage unit 211 is recorded to the second memory 33 in order to finish the updating procedure. In the embodiment, the first storage unit 211 is a Random Access Memory (RAM) or a Flash Memory etc., and is not limited thereto.

Figure 4:
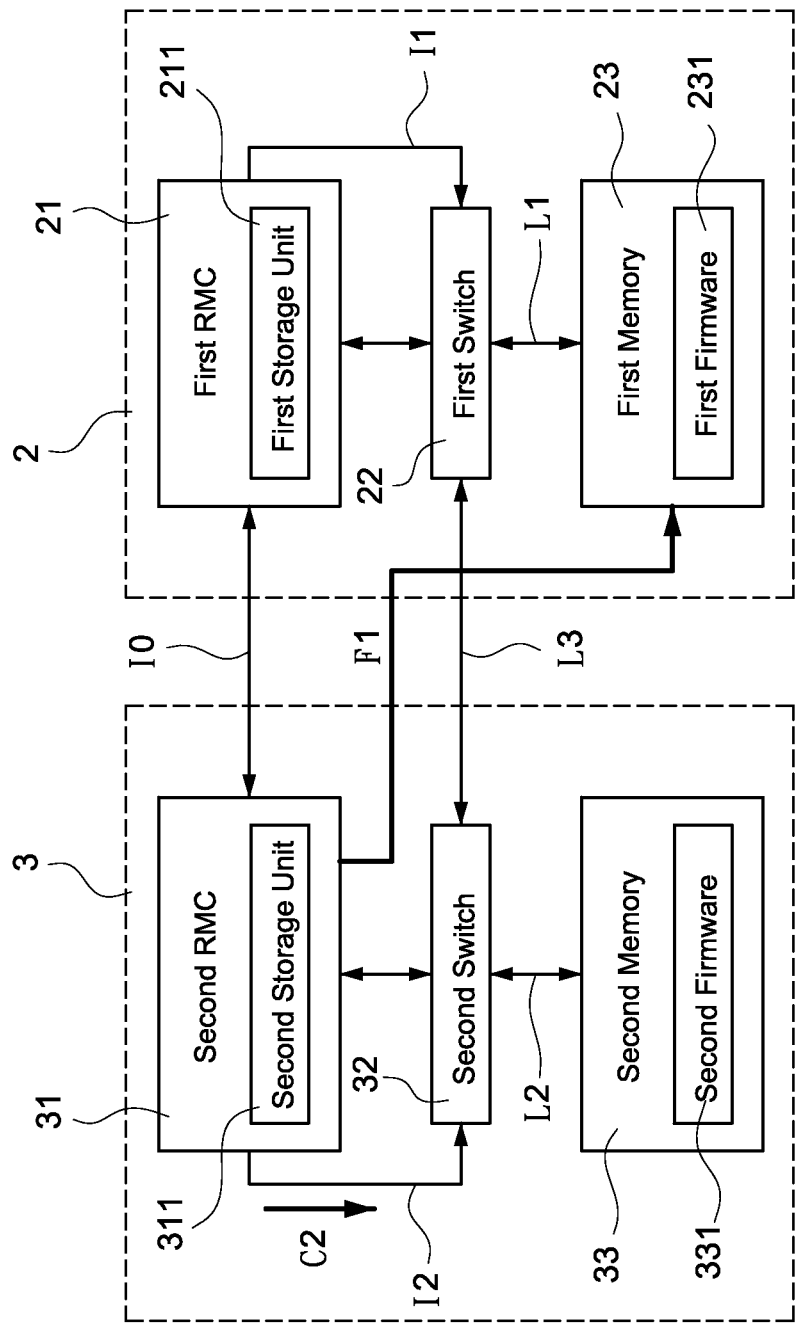
FIG. 4 is a schematic view of a firmware update operation in the second embodiment according to the present invention.

FIG. 4 is a schematic view of a firmware update operation in the second embodiment according to the present invention. FIG. 4 is used for illustrating the operation flow of the second rack management module 3.

When the second RMC 31 boots, the second RMC 31 retrieves the second firmware 331 in the second memory 33 via the second switch 32 and the second access channel L2 and the booting procedure is finished by executing the second firmware 331.

When the second RMC 31 receives the firmware update image F1 and the updating command, the second RMC 31 sends a second switching instruction C2 to the second switch 32 via the second instruction transmission interface I2, the second switch 32 switches and connects to the first switch 22 of the first rack management module 2 according to the second switching instruction C2. Thus, the second RMC 31 retrieves the first memory 23 via the second switch 32, the third access channel L3, the first switch 22 and the first access channel L1, and performs the updating procedure on the first firmware 231.

Similarly, after the updating procedure execution finishes, the second RMC 31 is reset, and the second switch 32 is recovered to the initial settings (i.e., connect to the second memory 33 via the second access channel L2). Thus, after the second RMC 31 is reset, the booting procedure is still finished by executing the second firmware 331 in the second memory 33. Similarly, even if the updating procedure execution fails last time, the booting operation of the second RMC 31 is not affected because the failed updating procedure is performed on the first firmware 231.

Similar to the above mentioned first storage unit 211, a second storage unit 311 is installed in the second RMC 31 for temporarily saving the firmware update image F1. When the second RMC 31 performs the updating procedure on the first firmware 231, the firmware update image F1 temporarily saved in the second storage unit 311 is recorded to the first memory 23 in order to finish the updating procedure. In embodiment, the second storage unit 311 is a RAM or a Flash Memory, and is not limited thereto.

As mentioned above, after the first RMC 21 performs the update on the second firmware 331, the first RMC 21 still boots via the first firmware 231 which is not updated; and after the second RMC 31 performs an update on the first firmware 231, the second RMC 31 still boots via the second firmware 331 which is not updated. Accordingly, in a preferred embodiment, the multiple rack management modules of the rack 1 simultaneously receives the externally transmitted firmware update image F1 and the updating command for respectively updating the firmware of the multiple rack management modules which assures that the firmware version is consistent. Nonetheless, the above is one of the preferred embodiments according to the present invention and is not limited thereto.

Figure 5:
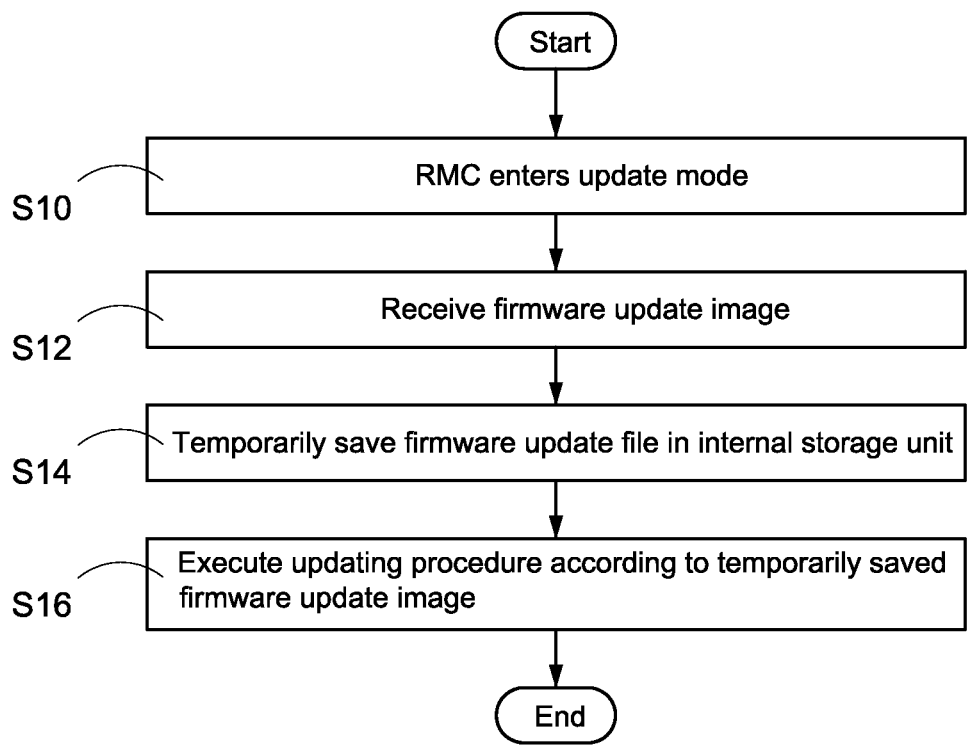
FIG. 5 is a flow chart for obtaining an updated image in the first embodiment according to the present invention.

FIG. 5 is a flow chart for obtaining an updated image in the first embodiment according to the present invention. As shown in FIG. 5, when the firmware of multiple RMCs of the rack 1 (only one RMC is used as an example in the following illustration) need to be updated, the rack 1 is connected to an external update tool (for example a personal computer or a cloud server etc. not shown in the diagrams). The update tool sends a control command to the RMC in rack 1 via an interface (for example sends an IPMI command via an IPMI Interface) for enabling the RMC to enter an updating mode (step S10).

Next, the RMC receives the firmware update image F1 via the update tool (step S12). The RMC temporarily saves the received firmware update image F1 in an internal storage unit (step S14), and check if the firmware update image F1 is correct. If the firmware update image F1 is correct, the RMC executes the updating procedure according to the temporarily saved firmware update image F1 (step S16). In the above mentioned embodiment, the first RMC 21 and the second RMC 31 both start to execute the updating procedure by following the above steps S10 to step S16.

Figure 6:
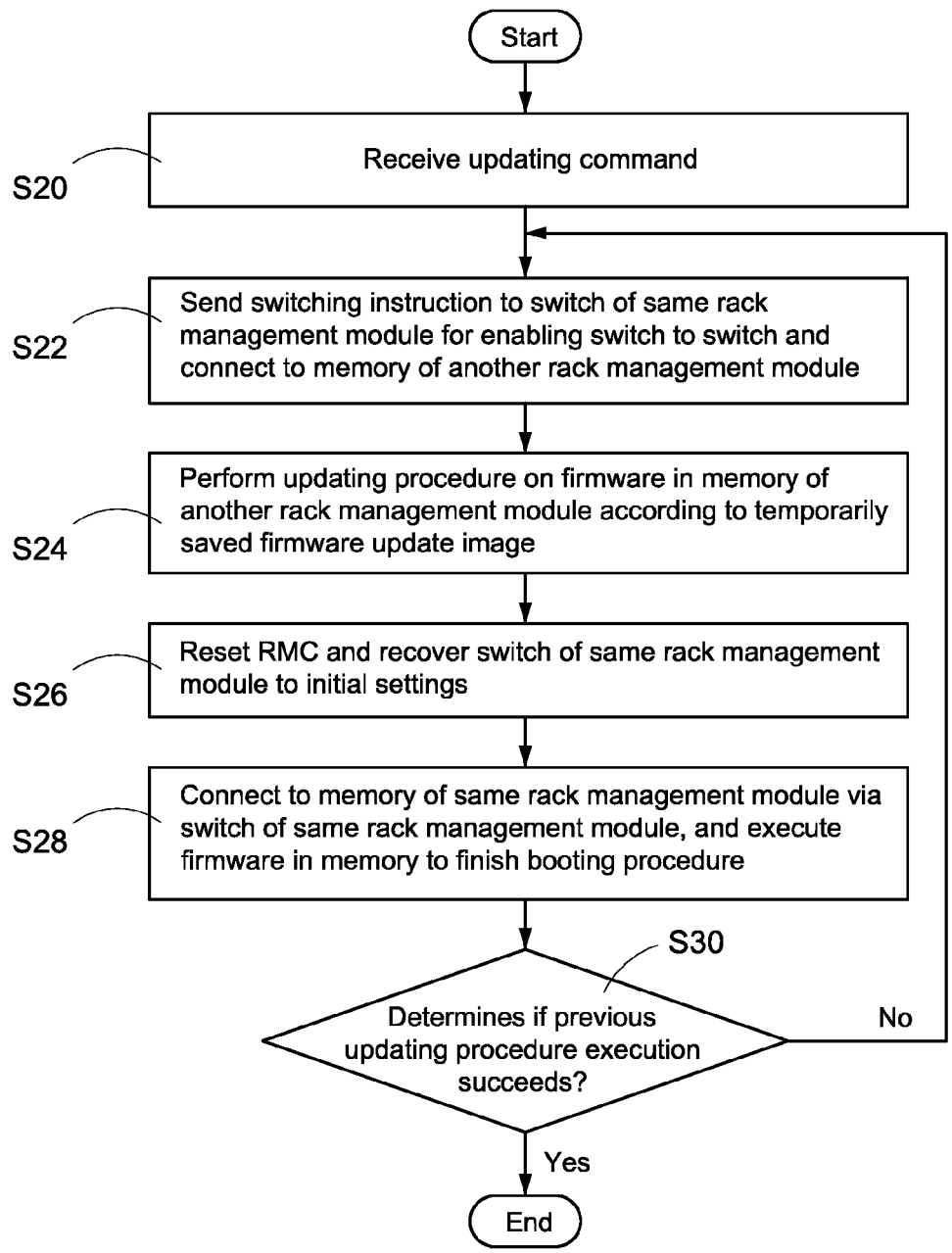
FIG. 6 is a flow chart for firmware update in the first embodiment according to the present invention.

FIG. 6 is a flow chart for firmware update in the first embodiment according to the present invention. In the present invention, the firmware update flow of the present invention is used in a rack with at least two rack management modules. First, the RMC in one of the rack management modules of the rack 1 (for example the first RMC 21 in the first rack management module 2) receives the above mentioned updating command (step S20). Next, the RMC sends the switching instruction to the switch of the same rack management module (for example the first switch 22) for enabling the switch to switch and connect to the memory of another rack management module (for example the second memory 33 in the second rack management module 3) (step S22).

After the switch finishes switching, the RMC performs updating procedure on firmware in the memory of another rack management module according to the firmware update image F1 temporarily saved in the installed storage unit (step S24). After the updating procedures execution finishes, the RMC is reset, and the switch of the same the rack management module is recovered to the initial settings (step S26), wherein, the switch connects to the memory of the same rack management module based on the initial settings after the step S26.

After the RMC which executes the updating procedure in the step S24 is reset, it connects to the memory of the same rack management module via the switch of the same rack management module, and executes the firmware in the memory to finish the booting procedure (step S28). Lastly, the RMC determines if the previous updating procedure execution succeeds (step S30). If the update fails, the step returns to step S22, and re-update the firmware of another rack management module. On the other hand, if the update succeeds, the RMC finishes the updating procedure.

The updating method of the present invention can effectively avoid the issue that the RMC is not able to boot normally after the firmware updating procedure fails.

Figure 7:
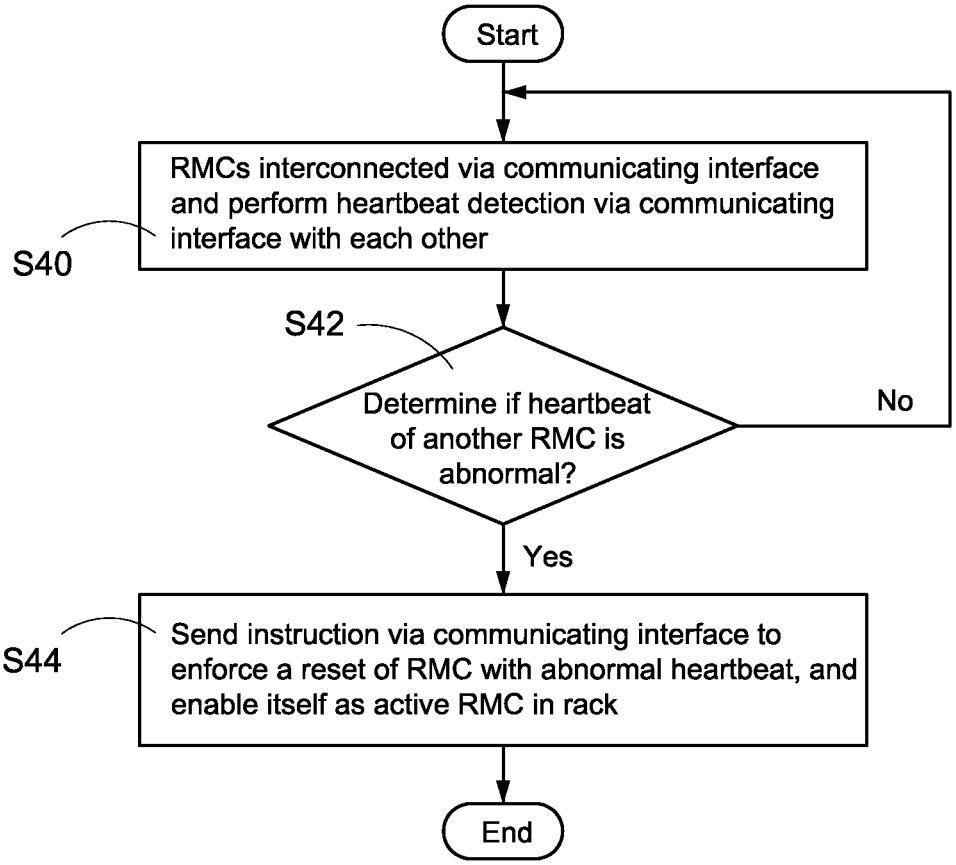
FIG. 7 is a backup flowchart in the first embodiment according to the present invention.

FIG. 7 is a backup flowchart in the first embodiment according to the present invention. The backup flow of the present invention is implemented on the rack with at least two rack management modules. Firstly, the RMCs of the at least two rack management modules in the rack 1 are interconnected via the communicating interface I0, and performs a heartbeat detection via the communicating interface I0 with each other (step S40).

During the heartbeat detection, each RMC respectively determines if the heartbeat of another RMC is abnormal (step S42). If the heartbeat of another RMC is normal, the step S40 is executed again in order to keep performing heartbeat detection on another RMC.

On the other hand, if the heartbeat of another RMC is abnormal after the detection, the RMC with normal heartbeat sends the instruction via the communicating interface I0 to enforce a reset of the RMC with abnormal heartbeat, and enable itself as the active RMC in the rack 1 (step S44). With the backup operation solution, when one of the RMCs in the rack 1 operates abnormally, another RMC then performs backup operation temporarily, and recovered to the original operation after the RMC operates abnormally is reset. As a result, it is avoided that multiple nodes in the rack 1 are not able to operate normally after certain RMCs have errors.

As the skilled person will appreciate, various changes and modifications can be made to the described embodiment. It is intended to include all such variations, modifications and equivalents which fall within the scope of the present invention, as defined in the accompanying claims.

What is claimed is:

1. A firmware updating method used by a rack comprising:
   a plurality of receiving slots;
   a plurality of nodes, respectively disposed in the plurality of receiving slots; and
   two rack management modules, electrically connected with the plurality of nodes, each rack management module respectively has a rack management controller (RMC), a switch and a memory, wherein the RMC connects to the memory via the switch, a firmware used for booting by the RMC is saved in the memory;
   wherein, when one of the rack management modules receives a firmware update image, the RMC sends a switching instruction to the switch in same rack management module for enabling the switch to switch and connect to the memory of another rack management module, and the RMC performs an updating procedure on the firmware in the memory of the another rack management module according to the firmware update image,
   the method comprising:
   a) receiving the firmware update image;
   b) sending the switching instruction to the switch of the same rack management module for enabling the switch to switch and connect to the memory of the another rack management module;
   c) performing the updating procedure on the firmware in the memory of the another rack management module according to the firmware update image;
   d) performing a reset of the RMC with executing the updating procedure, and the switch of the same rack management module is recovered to initial settings, wherein the switch connects to the memory of the same rack management module based on the initial settings;
   e) after the RMC reset finished, executing a booting procedure via the firmware in the memory of the same rack management module;
   f) Performing heartbeat detection by each RMC via a communicating interface;
   g) determining if heartbeats of another RMC is normal; and
   h) when the heartbeats of the another RMC is abnormal, sending instructions by the RMC with normal heartbeats to enforce a reset of the RMC with abnormal heartbeats and enabling itself to be an active RMC in the rack.

2. The firmware updating method of claim 1, wherein the step a) comprises following steps:
   a01) receiving the firmware update image and an updating command;
   a02) entering an updating mode; and
   a03) temporarily saving the firmware update image in a storage unit of the RMC.

3. The firmware updating method of claim 1, wherein the method comprises following steps:
   e01) after the step e, determining if the updating procedure succeeds; and
   e02) following the step e01, if the updating procedure fails, re-executing the step b to the step e.

4. The firmware updating method of claim 1, wherein the two rack management modules comprise a first rack management module and a second rack management module, the first rack management module comprises a first RMC, a first switch and a first memory, the first switch connects to the first memory via a first access channel, and a first firmware used by the first RMC is saved in the first memory; the second rack management module comprises a second RMC, a second switch and a second memory, the second switch connects to the second memory via a second access channel, and a second firmware used by the second RMC is saved in the second memory.

5. The firmware updating method of claim 4, wherein the first switch and the second switch are interconnected via a third access channel, when the first RMC executes the updating procedure, the first switch switches and connects to the second switch in order to access the second memory in the second rack management module sequentially via the first switch, the third access channel, the second switch and the second access channel; when the second RMC executes the updating procedure, the second switch switches and connects to the first switch in order to access the first memory of the first rack management module sequentially via the second switch, the third access channel, the first switch and the first access channel.

6. The firmware updating method of claim 1, wherein each RMC respectively connects to the switch of the same rack management module via an instruction transmission interface, and transmits the switching instruction via the instruction transmission interface for enabling the switch of the same rack management module to switch and connect to the memory of the another rack management module.

7. The firmware updating method of claim 1, wherein each RMC respectively has a storage unit for temporarily saving the externally transmitted firmware update image, when the RMC executes the updating procedure, the firmware update image temporarily saved in the storage unit is recorded to the memory of the another rack management module in order to finish the updating procedure.

8. The firmware updating method of claim 1, wherein each RMC are interconnected via a communicating interface, and detects heartbeats of each other via the communicating interface, wherein the communicating interface is a General Purpose I/O (GPIO) interface, an Universal Asynchronous Receiver/Transmitter (UART) interface, an Inter-Integrated Circuit ($I^2C$) interface, an Intelligent Platform Management Bus (IPMB) interface or a Local Area Network (LAN) interface.

* * * * *